Dec. 16, 1958     R. TEXTROM     2,864,610
ENDLESS-BELT RECORDER APPARATUS
Filed July 6, 1956
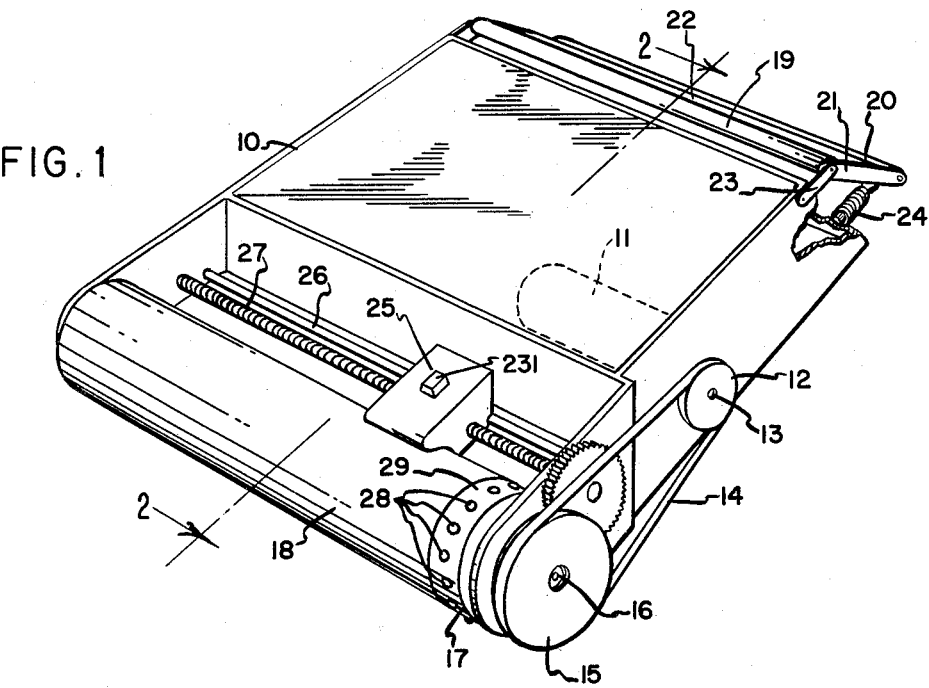
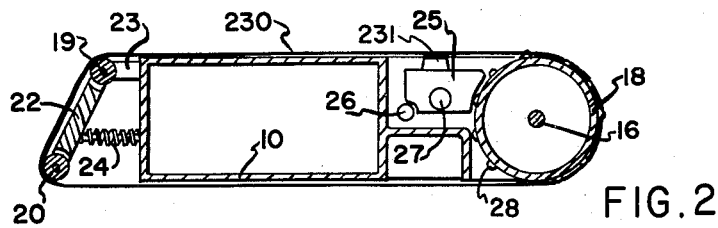
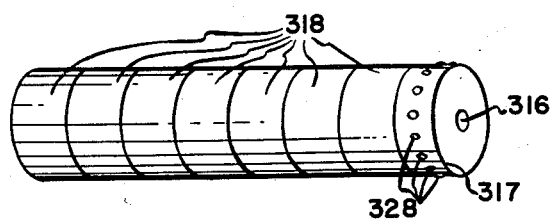
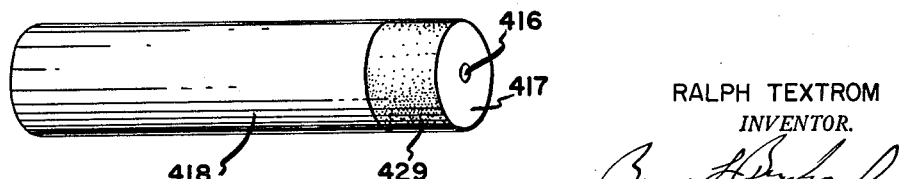
RALPH TEXTROM
*INVENTOR.*
BY
HIS ATTORNEY United States Patent Office 2,864,610
Patented Dec. 16, 1958

2,864,610

ENDLESS-BELT RECORDER APPARATUS

Ralph Textrom, Los Angeles, Calif., assignor to Hoffman Electronics Corporation, a corporation of California Application July 6, 1956, Serial No. 596,204

5 Claims. (Cl. 271—2.15)

The present invention relates to tape recorder apparatus, and more particularly to such apparatus incorporating a mechanism for driving, without lateral creepage, a recording medium of the endless-belt type.

With the relatively recent advent of magnetic tape in the recording field, many devices have been developed which employ such tape in an endless-belt form, rather than a lineal strip, with a belt width comparable to its length. Recording belts are often six inches or more in width as well as length. Such widths have given rise to many problems with respect to driving the belts. One such problem is the tendency of the belt to creep laterally over the driving mechanism, usually due to inequalities in the length of the belt. Such inequalities may be caused by initial differences in the length of a belt, unequal longitudinal stretching of the belt, improper handling of the belt by the operator, or the force applied by the recording head to the belt during recordation or play-back. In the case of the conventional one-piece driving roller in driving engagement with the entire width of the belt, a longer portion of the belt cannot travel fast enough to complete one revolution of that portion in the same time that the shorter portions are completing one revolution. For example, if a belt is nominally 15" long but has a portion that becomes 15¼" long, one revolution of the belt would result in a ¼" slack in the long portion. This excess length causes longitudinal stresses to be applied within the belt. Since the driving engagement of the roller with the entire width of the belt prevents relief of the longitudinal stresses, they distort the shape of the belt and become resolved into lateral stresses which cause a primarily lateral motion or "creep." Some devices have sought to eliminate the problem by employing flanges on spool-type driving rollers, or driving rollers having frictional surfaces for both friction driving of the belt and the prevention of creepage, both of these techniques unsuccessfully relying upon lateral motion restraining elements to prevent lateral movement of the belt. Other devices have used a belt with a plurality of sequentially, equally spaced, indexing holes running the length of the belt along one side thereof, with long indexing points, or sprocket elements, extending from the driving roller or associated mechanism, for engagement with the belt indexing holes and driving of the belt. The latter devices, however, create for the operator the additional problem of obtaining initial cooperation of the indexing points with the indexing holes.

One of the objects of the present invention is the provision of a novel tape recorder apparatus.

It is another object of the present invention to provide a novel tape recorder of the endless-belt type incorporating a driving roller device which eliminates lateral creepage of such endless belt.

A further object is the provision of a tape recorder of the endless-belt type having a driving roller which automatically compensates for differences in length of adjacent portions of such tape.

Additional and related objects will be clear to those skilled in the art upon careful examination of this specification, including the drawings and claims appended hereto.

According to the present invention, a tape recorder of the endless-belt type is provided with a driving roller having at least two portions, a drive portion and a freely rotatable roller portion, both the drive portion and the roller portion being cylindrical and having a common central axis of rotation and common diameters. In a preferred embodiment of this invention, the lateral dimension of the drive portion is considerably smaller than the lateral dimension of the roller portion.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1 is a perspective view of one embodiment of the present invention, showing the operative relationship of most of the mechanical elements of a tape recorder, according to the present invention.

Figure 2 is a partially cross-sectional view as seen along lines 2—2 in Figure 1, with the endless belt in operating position.

Figure 3 is a perspective view of another embodiment of a portion of the present invention.

Figure 4 is a perspective view of a third embodiment of a portion of this invention, similar in aspect to Figure 3.

As seen in Figures 1 and 2, the tape recorder has a chassis or case 10 of generally rectangular configuration provided with a motor 11 for driving a motor wheel 12 by means of the shaft 13, and a pulley belt 14 for transmitting the driving force to a drive wheel 15, both the motor wheel 12 and the drive wheel 15 being pulleys in the present illustration. The drive wheel 15 is secured to the shaft 16 which is rotatably mounted in the chassis 10. A drive member 17 is secured axially to the drive shaft 16 for rotation thereby. A roller 18 is mounted on the drive shaft 16 but in freely rotatable relationship with respect to both the shaft 16 and the drive member 17 and in laterally juxtaposed relationship to the latter. Idler rollers 19 and 20 may be rotatably mounted on a frame 21 having a lateral member 22. The frame 21 is pivotally mounted to brackets 23 which are secured to the recorder chassis 10, and a spring biasing member 24 is in outwardly biasing abutting engagement between lateral member 22 and the chassis 10 whereby the endless-belt type recording tape 230 may be disposed about the roller 18, drive member 17, and the idler rollers 19 and 20, and thereupon tensioned by the spring biasing action of member 24 forcing the idler roller 20 outwardly against the tape. Disposed within the shell of the chassis 10 is an embossing or magnetic recording and playback head assembly 25 slidably mounted on a lateral bar 26 and mounted upon a screw drive member 27 for progressive and continuous lateral motion thereby. For the sake of clarity and convenience, the motor means for lateral movement of the assembly 25 is not shown. The drive member 17 is provided with a plurality of equally spaced sprocket elements 28 adapted to cooperate with holes extending along the edge of the endless recording belt or tape 230. As shown, but not necessarily limited thereto, the sprocket elements 28 are spherical bearings embedded in the peripheral surface 29 of the drive member 17, with approximately half of the surface area of the bearings exposed.

Referring to Figure 2, it can be seen that a recording and playback head 231 is disposed within the assembly 25 so as to contact the inner surface of a tape 230 which, for the purposes of this discussion, may be considered a magnetic tape. Although it is standard practice for the force of the head 231 against the tape 230 to be only slight, the length of the tape 230 is increased slightly over that portion of the tape engaging the head at any particular moment. Although tapes commonly in use today have relatively little resiliency, the described change in length of the tape is sufficient to cause the tape to creep laterally over a driving roller of the standard type, as explained previously. The present invention, however, eliminates such creepage by driving the recording belt over only a relatively small portion of its lateral dimension, permitting the unequal lengths of the belt to be dimensionally absorbed or compensated by the freely rotatable roller 18.

Figure 3 illustrates another embodiment of the present invention wherein the cylindrical roller 18 of Figure 1 is split into a plurality of cylindrical rollers 318 having the same radii of curvature, each being independently rotatable about the drive shaft 316. Although the effect of the rollers 318 is substantially the same as the effect of the roller 18 of Figure 1, the Figure 3 embodiment is preferable in the case where the longitudinal tensional force applied to the tape is so great that the roller 18 cannot compensate for the total tendency of tape 230 to creep.

Figure 4 shows drive member 417, which is a modified form of drive member 17, having a frictional surface 429 rather than sprocket elements 28 and 328 of the prior figures. The frictional surface 429 may be composed of rubber or other means adapted to frictionally drive a recording belt, and may have a radius of curvature slightly greater than that of the roller 418 to assure positive frictional cooperation with the belt.

The operation of the device may be described as follows. Belt 230 is disposed about rollers 18, 19 and 20 and drive member 17, with spring biasing member 24 depressed, and then member 24 is released for the application of longitudinal tension by the roller 20 to belt 230. The initial driving rotation of the drive member 17 will cause the sprocket elements 28 to fall into the holes (not shown) along an edge of belt 230 and driving rotation thereof will thereupon commence. Since the rotation of the roller 18 is completely independent of the rotation of the drive member 17, any tendency of belt 230 to creep over the roller 18 will have no effect upon the driving engagement relationship between sprocket elements 28 and the holes of the belt 230. In the case of cylindrical rollers 18 and 418, the longer portion or portions of the belt will slip over the smooth surface. In the case of plural cylindrical rollers 318, the longer portion or portions either slip over their corresponding roller portions or else cause such individual roller portions to rotate more rapidly in proportion to the differences in belt lengths. In both cases, the longitudinal stresses are relieved so that the belt shape remains the same, thus preventing the occurrence of creep-causing lateral stresses.

It should be apparent to anyone skilled in the art that an additional drive member may be provided at the other end of the freely rotatable roller for additional drive force, if desired. Such an arrangement might be particularly advantageous if the belt is quite long or wide, or both.

Although the particular embodiments of the present invention that have been shown and described have indicated a magnetic recording and playback head engaging a magnetic tape type of endless-belt recording medium, it should be clear that a stylus may be used for embossing a medium in a manner well known in the art.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Recording apparatus, having a continuous recording medium of the endless-belt type, including, in combination: motor means; idler means; circular drive means having peripheral surface means adapted to engage said recording medium, said drive means being in cooperable relationship with respect to said motor means for rotation thereby; freely-rotatable cylindrical roller means having peripheral surface means in laterally juxtaposed relationship with respect to said peripheral surface means of said circular drive means; said circular drive means and said cylindrical roller means having a common central axis of rotation; said peripheral surface means of said drive means and said peripheral surface means of said cylindrical roller means jointly accommodating the tensional disposition thereabout of said recording medium at one effective end of said medium and said idler means accommodating the tensional disposition thereabout of said recording medium at the other effective end of said medium.

2. The apparatus as defined in claim 1 wherein said peripheral surface means of said drive means is substantially shorter than said peripheral surface means of said cylindrical roller means.

3. The apparatus as defined in claim 2 wherein said peripheral surface means of said drive means comprises friction means for frictional engagement with said recording medium.

4. The apparatus as defined in claim 2 wherein said cylindrical roller means comprises a plurality of juxtaposed cylindrical rollers having the same radii of curvature.

5. An endless-belt driving device for use with recording apparatus, said recording apparatus having motor means, idler means and a continuous recording medium of the endless-belt type, said recording medium being tensionally disposed about said idler means at one effective end of said medium and about said driving device at the other effective end of said medium, said driving device including, in combination: circular drive means having peripheral surface means adapted to engage said recording medium, said drive means being in cooperable relationship with respect to said motor means for rotation thereby; freely-rotatable cylindrical roller means having peripheral surface means in laterally juxtaposed relationship with respect to said peripheral surface means of said circular drive means; said circular drive means and said cylindrical roller means having a common central axis of rotation; and said peripheral surface means of said drive means and said peripheral surface means of said cylindrical roller means jointly accommodating the disposition thereabout of said recording medium.

No references cited.